США009835449B2

(12) United States Patent
Cho et al.

(10) Patent No.: US 9,835,449 B2
(45) Date of Patent: Dec. 5, 2017

(54) SURFACE MEASURING DEVICE AND METHOD THEREOF

(71) Applicant: INDUSTRIAL TECHNOLOGY RESEARCH INSTITUTE, Hsinchu (TW)

(72) Inventors: Chia-Hung Cho, Hsinchu (TW); Kai-Ping Chuang, Zhubei (TW); Ming-Cheng Tsai, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 66 days.

(21) Appl. No.: 14/934,607

(22) Filed: Nov. 6, 2015

(65) Prior Publication Data
US 2017/0059310 A1    Mar. 2, 2017

(30) Foreign Application Priority Data

Aug. 26, 2015   (TW) .............................. 104127948 A (51) Int. Cl.
*G01B 11/30*    (2006.01)
*G01B 21/04*    (2006.01)
(52) U.S. Cl.
CPC ............ *G01B 11/303* (2013.01); *G01B 21/04* (2013.01)
(58) Field of Classification Search
CPC .... G01B 7/105; G01B 7/107; G01B 11/0608; G01B 11/306; G01B 11/026;
(Continued)

(56) References Cited

U.S. PATENT DOCUMENTS 5,993,289 A   11/1999   Allen et al.
6,194,231 B1   2/2001   Ho-Cheng et al.
(Continued)

FOREIGN PATENT DOCUMENTS

JP   02083404 A   3/1990
JP   H0861949 A   3/1996
(Continued)

OTHER PUBLICATIONS

Intellectual Property Office, Ministry of Economic Affairs, R. O. C, "Office Action", Apr. 22, 2016, Taiwan.
(Continued)

*Primary Examiner* — Hoa Pham
(74) *Attorney, Agent, or Firm* — Locke Lord LLP; Tim Tingkang Xia, Esq.

(57) ABSTRACT

A surface measuring device includes a rotary platform, a shifting lever, a measuring module, and a control module. The rotary platform carries an object under test and rotates the object under test at a rotating speed. The shifting lever is above the rotary platform. The measuring module disposed on the shifting lever moves to measurement positions on the shifting lever and performs a surface height measurement at a sampling frequency to sampling points on a surface of the object under test when located at one measurement position. The control module selectively adjusts the rotational speed for the rotary platform or the sampling frequency for the measuring module according to the measurement position of the measuring module on the shifting lever in order to fit a distance between the sampling points on at least one part of the surface of the object under test to a sampling rule.

26 Claims, 11 Drawing Sheets

(58) Field of Classification Search
CPC ..... G01B 11/303; B24B 37/20; B24B 37/107; B24B 29/10; B24B 7/00
USPC .................................................. 356/601–635
See application file for complete search history.

(56) References Cited

U.S. PATENT DOCUMENTS

| | | | |
|---|---|---|---|
| 6,343,974 B1* | 2/2002 | França et al. ........... | B24B 49/10 451/10 |
| 6,436,232 B1 | 8/2002 | Silenius et al. | |
| 7,065,238 B2 | 6/2006 | Onoyama et al. | |
| 7,175,503 B2 | 2/2007 | Lehman et al. | |
| 7,201,632 B2 | 4/2007 | Elledge | |
| 7,235,488 B2 | 6/2007 | Elledge | |
| 7,306,506 B2 | 12/2007 | Elledge | |
| 8,169,868 B2 | 5/2012 | Ishihara | |
| 8,932,883 B2 | 1/2015 | Matsuo et al. | |
| 8,992,286 B2* | 3/2015 | Cherian ................. | B24B 49/12 451/285 |
| 9,156,122 B2* | 10/2015 | Shinozaki ............. | B24B 37/042 |
| 2004/0242123 A1 | 12/2004 | Wiswesser et al. | |
| 2009/0042481 A1 | 2/2009 | Mavliev et al. | |
| 2012/0309267 A1 | 12/2012 | Shinozaki et al. | |
| 2014/0138355 A1* | 5/2014 | Yavelberg ............... | B24B 7/228 216/53 |
| 2014/0162534 A1* | 6/2014 | Lin ................... | H01L 21/02021 451/41 |
| 2015/0170978 A1 | 6/2015 | Chen et al. | |
| 2017/0059311 A1* | 3/2017 | Cho ..................... | G01B 11/303 |

FOREIGN PATENT DOCUMENTS

| | | |
|---|---|---|
| JP | H1086056 A | 4/1998 |
| JP | 2004012302 A | 1/2004 |
| JP | 2005088128 A | 4/2005 |
| JP | 2005195545 A | 7/2005 |
| JP | 2006194846 A | 7/2006 |
| JP | 2007019434 A | 1/2007 |
| JP | 2008268387 A | 11/2008 |
| JP | 2009148877 A | 7/2009 |
| JP | 2010240837 A | 10/2010 |
| JP | 2011530418 A | 12/2011 |
| JP | 2012137469 A | 7/2012 |
| JP | 2014055920 A | 3/2014 |
| JP | 2014091190 A | 5/2014 |
| TW | 491753 | 6/2002 |
| TW | 200930497 | 7/2009 |
| TW | 201308412 A1 | 2/2013 |
| TW | 201422367 A | 6/2014 |
| TW | M482476 U | 7/2014 |
| TW | 201438844 A | 10/2014 |
| TW | 201438845 A | 10/2014 |
| TW | 201446420 A | 12/2014 |
| TW | I475210 B | 3/2015 |

OTHER PUBLICATIONS

John McGrath et al., Polishing pad surface characterisation in chemical mechanical planarisation, Journal of Materials Processing Technology, 2004, p. 666-673, 153-154.

Heming Wang et al., Fractal dimension analysis on pore structure of artificial cores using magnetic resonance imaging, Consumer Electronics, Communications and Networks (CECNet), 2012, p. 2593-2596.

Eun-Sang Lee et al., Evaluation of the wafer polishing pad capacity and lifetime in the machining of reliable elevations, International Journal of Machine Tools and Manufacture(66), 2013, p. 82-94.

Intellectual Property Office, Ministry of Economic Affairs, R. O. C, "Office Action", Jan. 16, 2017, Taiwan.

* cited by examiner

SURFACE MEASURING DEVICE AND METHOD THEREOF

CROSS-REFERENCE TO RELATED APPLICATIONS

This non-provisional application claims priority under 35 U.S.C. §119(a) on Patent Application No(s). 104127948 filed in Taiwan, R.O.C. on Aug. 26, 2015, the entire contents of which are hereby incorporated by reference.

TECHNICAL FIELD

The disclosure relates to a surface measuring device and a method thereof.

BACKGROUND

During the measurement of a spinning object's surface, the distribution of sampling points to be measured is usually tighter when associated measurement positions are closer to a spin axis; otherwise, the distribution of sampling points to be measured is usually looser when associated measurement positions are farther from the spin axis. This causes the uneven distribution of sampling points to be measured on the object's surface. That is, such a conventional way to measure a spinning object may not evenly sample an object's surface for the acquirement of the accurate status of the object's surface or for the analysis of the object's surface.

For example, most of modern technologies use the chemical mechanical polishing (CMP) technology to smooth semiconductor wafers' surfaces. The polishing apparatus based on this technology usually makes a spinning polishing pad and a semiconductor wafer oppositely move in order to smooth the semiconductor wafer's surface. Therefore, in the chemical-mechanical polishing technology the surface roughness of the polishing pad greatly affects the smooth quality of semiconductor wafers. If a technology capable of evenly sampling the surface of a spinning polishing pad is promoted, the surface status of the polishing pad may be handled more accurately, whereby the chemical-mechanical polishing technology may have a higher efficiency and the cost of polishing semiconductor wafers may be controlled more efficiently.

SUMMARY

According to one or more embodiments, the disclosure provides a surface measuring device. In an embodiment, the surface measuring device includes a rotary platform, a shifting lever, a measuring module, and a control module. The rotary platform allows an object under test to be disposed thereon, and the rotary platform turns the object under test by a rotational speed. The shifting lever is located above the rotary platform. The measuring module is disposed on the shifting lever, and the measuring module provides measurement positions on the shifting lever. When the measuring module is at one measurement position, the measuring module performs a surface height measurement on sampling points on a surface of the object under test at a sampling frequency. The control module selectively adjusts the rotational speed of the rotary platform or the sampling frequency of the measuring module according to the measurement position of the measuring module on the shifting lever so that a distance between sampling points in at least a part of the surface of the object under test fits in a sampling rule.

According to one or more embodiments, the disclosure provides a surface measurement method. In an embodiment, the surface measurement method includes the following steps. Turn an object under test at a rotational speed. Perform a surface height measurement on sampling points on a surface of the object under test at a sampling frequency by a measuring module when the measuring module is at one of measurement positions. Selectively adjust the rotational speed of the object under test or the sampling frequency of the measuring module according to one of the measurement positions the measuring module is located at. Therefore, a distance between the sampling points in at least a part of the surface of the object under test fits in a sampling rule.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Please refer to FIG. 1 to FIG. 4, which are a schematic diagram of a surface measuring device 1, a functional block diagram of the surface measuring device 1, a schematic view of sampling points in at least a region on an object under test, and another schematic view of sampling points in at least a region on an object under test, respectively. The surface measuring device 1 includes a rotary platform 10, a moving mechanism 12, a measuring module 14, and a control module 16. The rotary platform 10 carries an object under test 20 and turns the object under test 20 by a rotational speed. The moving mechanism 12 includes a shifting lever 121 located above the rotary platform 10. The measuring module 14 is located on the shifting lever 121 and can move along the shifting lever 121 and stop at each of multiple measurement positions on the shifting lever 121 for a measurement task. When the measuring module 14 is at one of the measurement positions, the measuring module 14 performs a surface height measurement at a sampling frequency to sampling points on a surface of the object under test. The control module 16 selectively adjusts the rotational speed of the rotary platform 10 or the sampling frequency of the measuring module 14 according to the measurement position on the shifting lever 121 the measuring module 14 is located at. Therefore, the distance between the sampling points in at least one part of the surface of the object under test 20 fits in a sampling rule.

Figure 1:
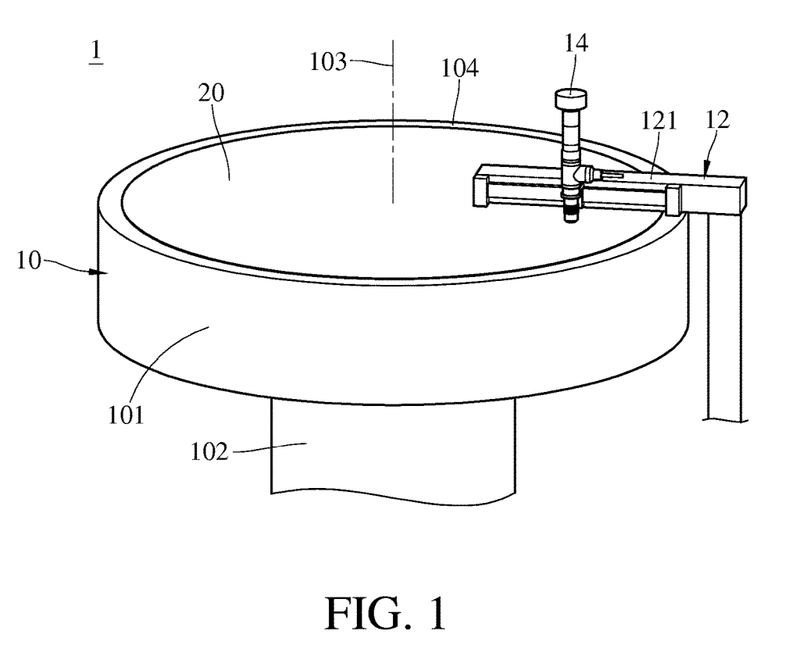
FIG. 1 is a schematic diagram of a surface measuring device in an embodiment.
Figure 2:
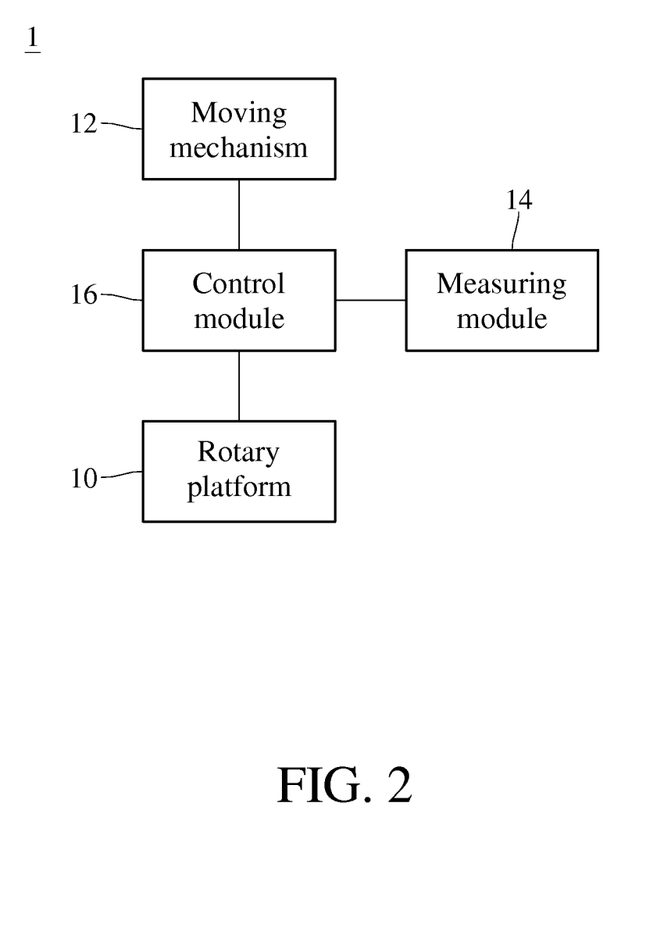
FIG. 2 is a functional block diagram of the surface measuring device in an embodiment.

Embodiments of the above selective adjusting of the rotational speed of the rotary platform 10 or the sampling frequency of the measuring module 14 performed by the control module 16 include that the control module 16 adjusts the sampling frequency of the measuring module 14 when the rotational speed of the rotary platform 10 is constant, or adjusts the rotational speed of the rotary platform 10 when the sampling frequency of the measuring module 14 is constant; and that the control module 16 simultaneously adjusts the rotational speed of the rotary platform 10 as well as the sampling frequency of the measuring module 14. This will be described in detail later. In an embodiment, the above sampling rule is that a sampling point has the same distance with its closest neighboring sampling points, or is that every two neighboring sampling points on a different radius of gyration has the same distance therebetween. The sampling rule will be described in detail later.

In an embodiment, the rotary platform 10 includes a bearing platform 101 and a rotary shaft 102. The bearing platform 101 is disposed on the rotary shaft 102 and rotates around the spin axis 103. The bearing platform 101 includes a carrying surface 104. The object under test 20 is, for example, but not limited to, a polishing pad, SiC substrate or GaN substrate. The object under test 20 is disposed on the carrying surface 104 of the bearing platform 101, and the surface to be measured of the object under test 20 faces the measuring module 14. The measuring module 14 is, for example, a measuring apparatus based on the chromatic confocal technology or the laser confocal technology. The measuring module 14 moves along the shifting lever 121 of the moving mechanism 12, and an extension direction of the shifting lever 121 is substantially vertical to the normal line of the carrying surface 104. Therefore, the measuring module 14 can move along the extension direction of the shifting lever 121 in order to perform a surface height measurement on the surface to be measured of the object under test 20. The control module 16 is electrically connected to the rotary platform 10, the moving mechanism 12 and the measuring module 14, and the control module 16 controls the measuring module 14 to move on the shifting lever 121 of the moving mechanism 12. Also, the control module 16 adjusts the rotational speed of the rotary platform 10 or the sampling frequency of the measuring module 14 according to the measurement position on the shifting lever 121, where the measuring module 14 is located.

Figure 3:
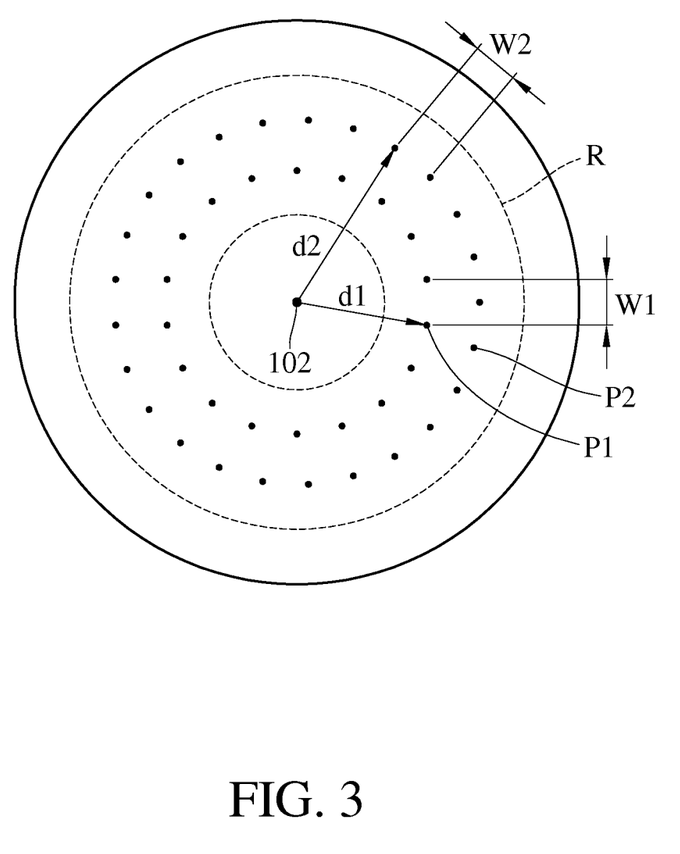
FIG. 3 is a schematic view of sampling points in at least a region on an object under test in an embodiment.

In an embodiment, the control module 16 sets the rotational speed of the rotary platform 10 to be constant and meanwhile adjusts the sampling frequency of the measuring module 14 according to the measurement position the measuring module 14 is located at. For example, if the measurement position where the measuring module 14 is located is closer to the spin axis 103, the control module 16 lowers the sampling frequency of the measuring module 14 more. In other words, the more the distance from the spin axis 103 to the projection of the measuring module 14 on the surface to be measured of the object under test 20 is short, the more the sampling frequency of the measuring module 14 is lower; and the more the distance from the spin axis 103 to the projection of the measuring module 14 on the surface to be measured of the object under test 20 is longer, the more the sampling frequency of the measuring module 14 increases. Therefore, the measuring module 14 can obtain first sampling points P1 and second sampling points P2 in at least a part of the surface of the object under test 20, and all the sampling points fit in the sampling rule. For example, the first sampling points P1 and the second sampling points P2 obtained in at least the region R on the surface of the object under test 20 fit in the sampling rule.

In this embodiment, the first sampling point P1 is a first distance d1 away from the spin axis 103, and the second sampling point P2 is a second distance d2 away from the spin axis 103. When a distance w1 between every two neighboring first sampling points P1 among all the first sampling points P1 is substantially equal to a distance w2 between every two neighboring second sampling points P2 among all the second sampling points P2, the first sampling points P1 and the second sampling points P2 all fit in the sampling rule.

In the above embodiments with respect to FIG. 3, the first sampling points P1 and the second sampling points P2 are merely used to simply exemplify the disclosure rather than to limit the scope of the disclosure. In an embodiment, the measuring module 14 can further acquire, for example, but not limited to, third sampling points which are a third distance away from the spin axis 102, and fourth sampling point which are a fourth distance away from the spin axis 102.

Figure 4:
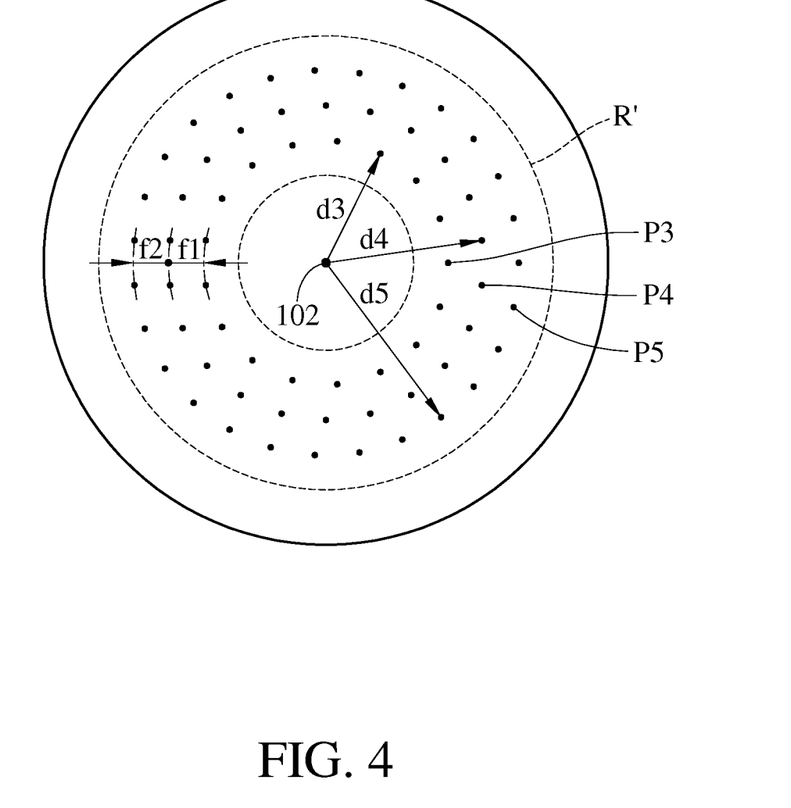
FIG. 4 is a schematic view of sampling points in at least a region on an object under test in another embodiment.

In an embodiment with respect to FIG. 4, when the measuring module 14 obtains third sampling points P3, fourth sampling points P4 and fifth sampling points P5 and the third distance d3 is shorter than the fourth distance d4 shorter than the fifth distance d5, the delta f1 between the third distance d3 and the fourth distance d4 is substantially equal to the delta f2 between the fourth distance d4 and the fifth distance d5.

When the measurement position, which the measuring module 14 on the shifting lever 121 arrives at, is a preset position and the sampling frequency of the measuring module 14 is at a preset frequency, the control module 16 adjusts the rotational speed of the rotary platform 10. That is, when the projection of the measuring module 14 on the surface of the object under test 20 arrives on, for example, the inner edge of the region R and the sampling points of the measuring module 14 on the inner edge of the region R cannot yet fit in the sampling rule even if the control module 16 adjusts the sampling frequency of the measuring module 14 to be the minimum, then the control module 16 needs to increase the rotational speed of the rotary platform 10.

In another embodiment, the control module 16 sets the sampling frequency of the measuring module 14 to be constant and meanwhile adjusts the rotational speed of the rotary platform 10 according to the measurement position which the measuring module 14 on the shifting lever 121 is located at. For example, when the measurement position of the measuring module 14 on the shifting lever 121 is getting close to the spin axis 103, the control module 16 increases the rotational speed of the rotary platform 10. That is, when the distance from the spin axis 103 to the projection of the measuring module 14 on the surface to be measured of the object under test 20 is shorter, the rotational speed of the rotary platform 10 will increase; and when the distance from the spin axis 103 to the projection of the measuring module 14 on the surface to be measured of the object under test 20 is longer, the rotational speed of the rotary platform 10 decreases. Therefore, the first sampling points P1 and the second sampling points P2 obtained by the measuring module 14 in at least the region R on the surface of the object under test 20 can fit in the sampling rule.

In an example, when the rotary platform 10 reports that the current speed is 5 seconds per turn and the shifting lever 121 reports that a radius of gyration corresponding to the current measurement position is 0.1 meter, then the current sampling frequency, which is directly associated with the rotational speed ($v=2\pi \times 0.1/5=0.04\pi$ m/s) of the rotary platform 10 corresponding to the current measurement position, should be adjusted. When the sampling is performed once per an interval D on the circumference of a circle based on the spin axis 103 as a center and corresponding to the current measurement position, the sampling frequency is calculated on a following formula for a sampling cycle T:

$$T=D/v=D/(2\pi r\omega).$$

Where r represents a distance from the current measurement position to the spin axis 103, $\omega$ represents an angular velocity of rotation for a rotary platform and uses rad/s as its unit. The sampling frequency is a reciprocal of the sampling cycle T.

In other words, when the shifting lever 121 reports that the current measurement position moves toward the spin axis 103 far from the rotary platform 10, the sampling rate increases with the enhance of the rotational speed because of the increase of radius of gyration, whereby the measuring interval will not change with the change of the radius of gyration. This can be applied to different situations including, for example: (1) adjusting the sampling frequency if the rotational speed is constant and the measurement position changes; (2) adjusting the rotational speed if the sampling frequency is constant and the measurement position changes; and (3) adjusting the rotational speed if the sampling frequency achieves its maximum limitation and is no longer changing in response to the change of the measurement position.

Similarly, in this embodiment, the first sampling point P1 is the first distance d1 away from the spin axis 103, and the second sampling point P2 is the second distance d2 away from the spin axis 103. When a distance w1 between every two neighboring first sampling points P1 of the first sampling points P1 is substantially equal to a distance w2 between every two neighboring second sampling points P2 of the second sampling points P2, the first sampling points P1 and the second sampling points P2 fit in the sampling rule. In practice, when the measurement position, which the measuring module 14 on the shifting lever 121 arrives at, is a preset position and the rotational speed of the rotary platform 10 is at a preset speed, the control module 16 adjusts the sampling frequency of the measuring module 14. In other words, when the projection of the measuring module 14 onto the surface of the object under test 20 is at the inner edge of the region R, the control module 16 will reduce the sampling frequency of the measuring module 14 since the sampling points acquired by the measuring module 14 at the inner edge of the region R cannot fit in the sampling rule yet even if the control module 16 is adjusting the rotational speed of the rotary platform 10 to the maximum.

As described above, the control module 16 adjusts the sampling frequency of the measuring module 14 according to the measurement position of the measuring module 14 on the shifting lever 121 while the rotational speed of the rotary platform 10 is constant; or adjusts the rotational speed of the rotary platform 10 according to the measurement position of the measuring module 14 on the shifting lever 121 while the sampling rate of the measuring module 14 is constant. Accordingly, the object under test 20 may evenly sampled in order to acquire the surface status of the object under test 20. Other embodiments may be contemplated by a person skilled in the art in which the control module 16 simultaneously adjusts both the sampling frequency of the measuring module 14 and the rotational speed of the rotary platform 10 according to the measurement position of the measuring module 14 on the shifting lever 121 in order to ensure that the sampling points of the measuring module 14 in at least the region R on the surface of the object under test 20 can fit in the sampling rule. This can be referred to the above relevant descriptions.

Figure 5:
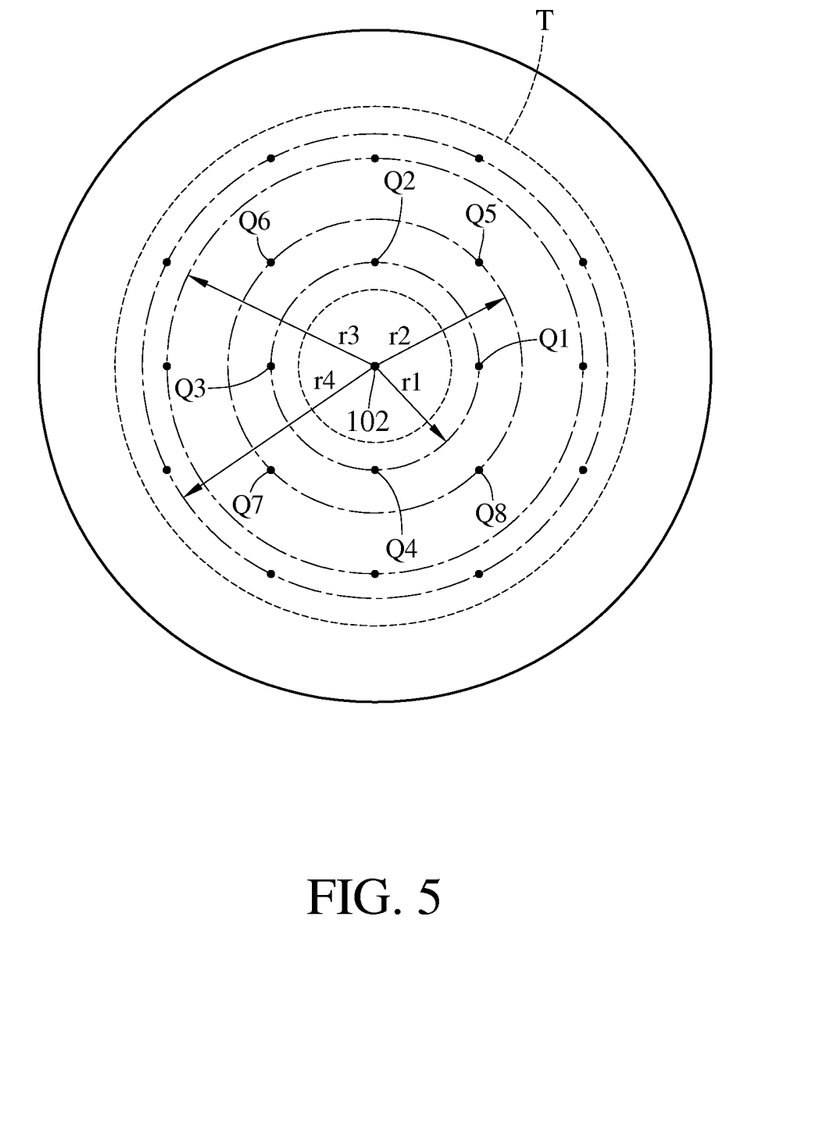
FIG. 5 is a schematic view of sampling points in at least a region on an object under test in another embodiment.

Please refer to FIG. 1 to FIG. 2 and FIG. 5, which is a schematic view of sampling points in at least a region on an object under test in another embodiment. In an example, the control module 16 simultaneously adjusts the sampling frequency of the measuring module 14 and the rotational speed of the rotary platform 10 according to the measurement position of the measuring module 14 on the shifting lever 121 in order to ensure that the sampling points of the measuring module 14 in at least one region of the surface of the object under test 20 can fit in another sampling rule. The control module 16 controls the measuring module 14 to move along the extension direction of the shifting lever 121 so that the projection of the measuring module 14 onto the surface of the object under test 20 chronologically arrives at a first position, second position, third position and a fourth position. The distance between the first position and the spin axis 103 is a first radius r1, the distance between the second position and the spin axis 103 is a second radius r2, the distance between the third position and the spin axis 103 is a third radius r3, and the distance between the fourth position and the spin axis 103 is a fourth radius r4. The first radius r1 to the fourth radius r4 are based on the positions of preset sampling points.

In an embodiment as described in FIG. 5, the sampling points in a region T are substantially arranged in a 5×5 matrix. Herein, sampling points Q1~Q4 are located on the circumference of a circle of the first radius r1 starting from the spin axis 103, sampling points Q5~Q8 are located on the circumference of a circle of the second radius r2 starting from the spin axis 103, and other sampling points can be deduced by analogy to be located on the circumferences of circles of the third radius r3 and fourth radius r4 starting from the spin axis 103, respectively. When the measuring module 14 is at the first position, the control module 16 adjusts the sampling frequency of the measuring module 14 and the rotational speed of the rotary platform 10 according to the position of the preset sampling point, whereby the measuring module 14 sequentially performs the surface height measurement at the sampling points Q1~Q4. When the measuring module 14 is located at the second position, the control module 16 adjusts the sampling frequency of the measuring module 14 and the rotational speed of the rotary platform 10 according to the position of the preset sampling point, whereby the measuring module 14 sequentially performs the surface height measurement at the sampling points Q5~Q8. Similarly, when the measuring module 14 is chronologically located at the third position and the fourth position, the sampling frequency of the measuring module 14 and the rotational speed of the rotary platform 10 will be adjusted according to the position of the preset sampling point so that the measuring module 14 can chronologically perform the surface height measurement at other designated sampling points in the region T.

Accordingly, it conforms to the sampling rule when each of the sampling points has the same distance with its closest neighboring sampling points in at least the region T on the surface of the object under test 20. That is, since the control module 16 adjusts the sampling frequency of the measuring module 14 and the rotational speed of the rotary platform 10 in accordance with the sampling rule, the measuring module 14 is able to evenly sample the object under test 20 in order to acquire the more accurate surface status of the object under test.

In this embodiment, the control module 16 simultaneously adjusts the sampling frequency of the measuring module 14 and the rotational speed of the rotary platform 10 so that each of the sampling points has the same distance with its neighboring sampling points in the region T on the surface of the object under test 20. In another embodiment, the control module 16 sets either the sampling frequency of the measuring module 14 or the rotational speed of the rotary platform 10 to be constant and meanwhile adjusts the other one so that each of the sampling points has the same distance with its neighboring sampling points in the region T on the surface of the object under test 20.

Please refer to FIG. 6 to FIG. 9, which are a schematic diagram of a surface measuring device 3, a functional block diagram of the surface measuring device 3, a schematic view of a measuring module, and a schematic wavelength distribution diagram of a reflected light beam, respectively. The surface measuring device 3 includes a rotary platform 30, a moving mechanism 32, a measuring module 34, a control module 36, a calculation module 38, and a slurry supply pipe 39. The rotary platform 30 includes a bearing platform 301, a rotary shaft 302, and a polishing head 305. The bearing platform 301 is disposed on the rotary shaft 302 and spins about the spin axis 303. The bearing platform 301 includes a carrying surface 304 for accommodating the polishing pad 40 so that the polishing head 305 can press a wafer 50 onto the polishing pad 40. When the polishing head 305 is pressing the wafer 50 to make it contact the polishing pad 40, the rotary platform 30 turns the polishing pad 40 and the polishing head 305 turns the wafer 50, thereby the wafer 50 and the polishing pad 40 are oppositely spun. Therefore, the polishing pad 40 performs the surface smoothing process to the wafer 50. The slurry supply pipe 39 provides slurry onto the wafer 50 during the surface smoothing process.

Figure 6:
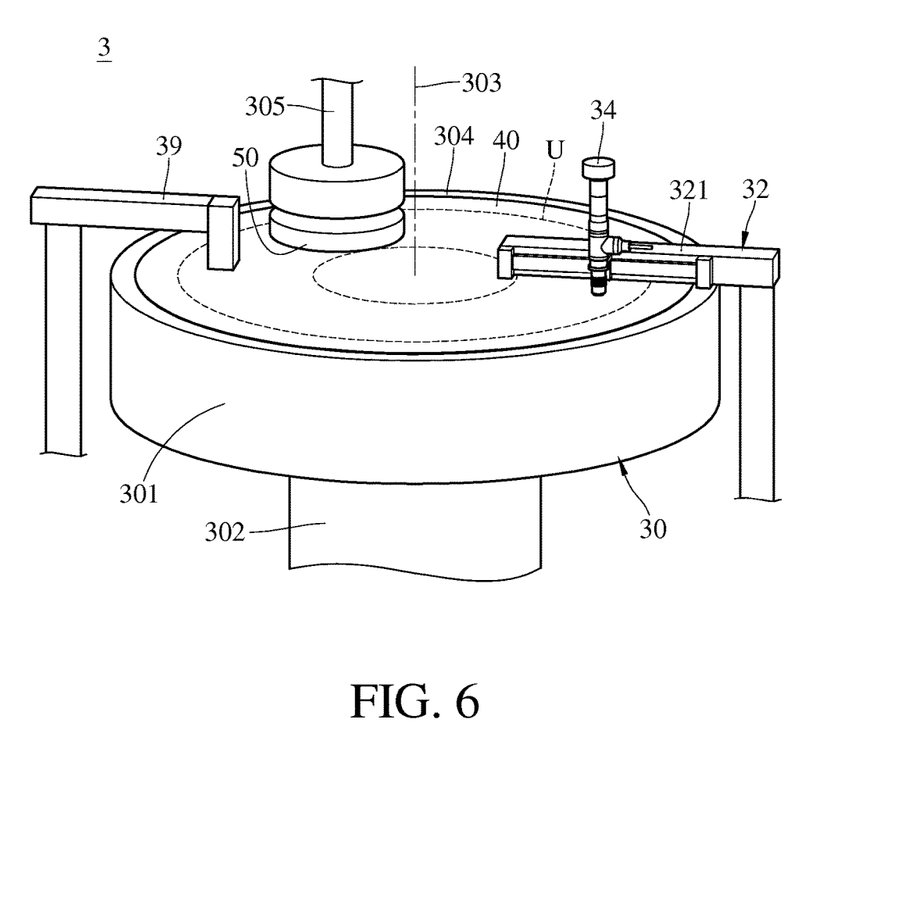
FIG. 6 is a schematic diagram of a surface measuring device in another embodiment.

In an embodiment, a region from a circle of a radius of the first distance to a circle of a radius of the second distance around the spin axis 303 on the top surface of the polishing pad 40 is defined as a task region U. The polishing pad 40 uses its task region U to perform the smoothing process on the wafer 50. When the wafer 50 is being smoothed, the measuring module 34 selectively performs the surface height measurement on the sampling points in the task region U of the polishing pad 40. In this embodiment, the extension direction of the shifting lever 321 is, for example, but not limited to a radial direction of the carrying surface 304 or the polishing pad 40. Other embodiments may be contemplated in which only if either the projection of the shifting lever onto the surface of the carrying surface 304 or the polishing pad 40 extends at least from a position, having a first distance with the spin axis 303, to another position, having a second distance with the spin axis 303, can the shifting lever 321 have any possible extension direction.

Figure 7:
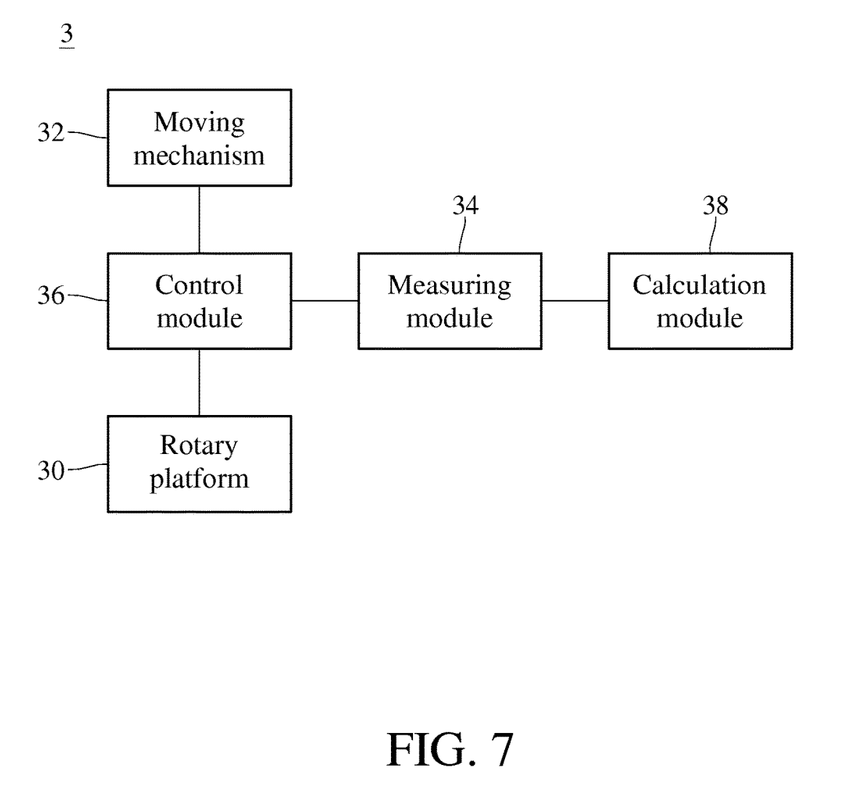
FIG. 7 is a functional block diagram of the surface measuring device in another embodiment.

The measuring module 34 is disposed on the shifting lever 321 and has measurement positions on the shifting lever 321. When the measuring module 34 is at one of the measurement positions, the measuring module 34 performs the surface height measurement on sampling points on the surface of the object under test by a sampling frequency. Particularly, the measuring module 34 projects light beams having different wavelengths to those sampling point in order to measure them. When the measuring module 34 receives a reflected light beam propagating from one sampling point reflecting the light beam, the calculation module 38 calculates the surface height of this sampling point according to the wavelength of the received reflected light beam.

Figure 8:
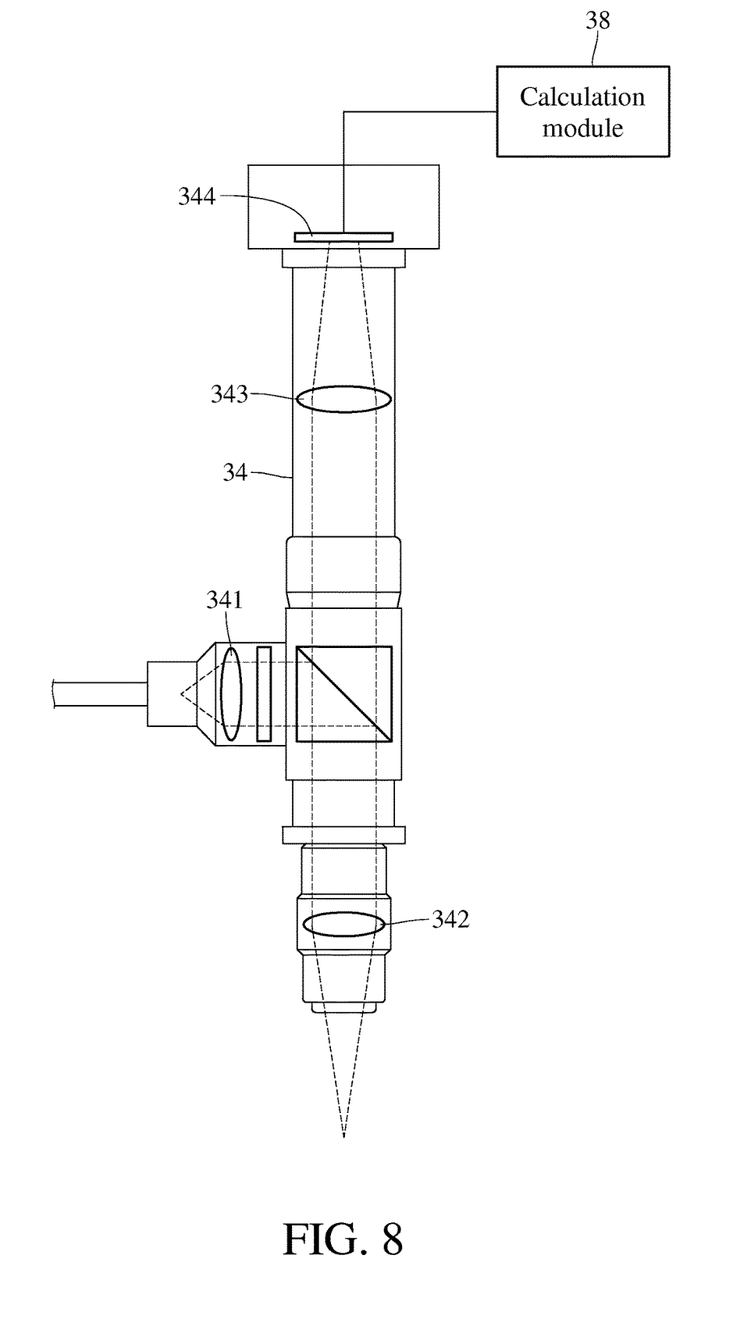
FIG. 8 is a schematic view of a measuring module in an embodiment.

For example, the measuring module 34 includes an input lens 341, an incident lens 342, an output lens 343, and a photosensor 344. There is a water film at the sampling points on the top surface of the polishing pad 40. When a light beam having a wavelength of 380 nm~780 nm is projected to one sampling point on the top surface of the polishing pad 40 having the water film thereon after sequentially passing through the input lens 341 and the incident lens 342 in the measuring module 34, this light beam will be reflected by the water film and the polishing pad 40 to form reflected lights. A first reflected light propagating from the water film and a second reflected light propagating from the polishing pad 40 are collected by the photosensor 344 after passing through the output lens 343 in the measuring module 34. The photosensor 344 detects the wavelength, e.g. 450 nm, of the first reflected light and the wavelength, e.g. 650 nm, of the second reflected light.

Figure 9:
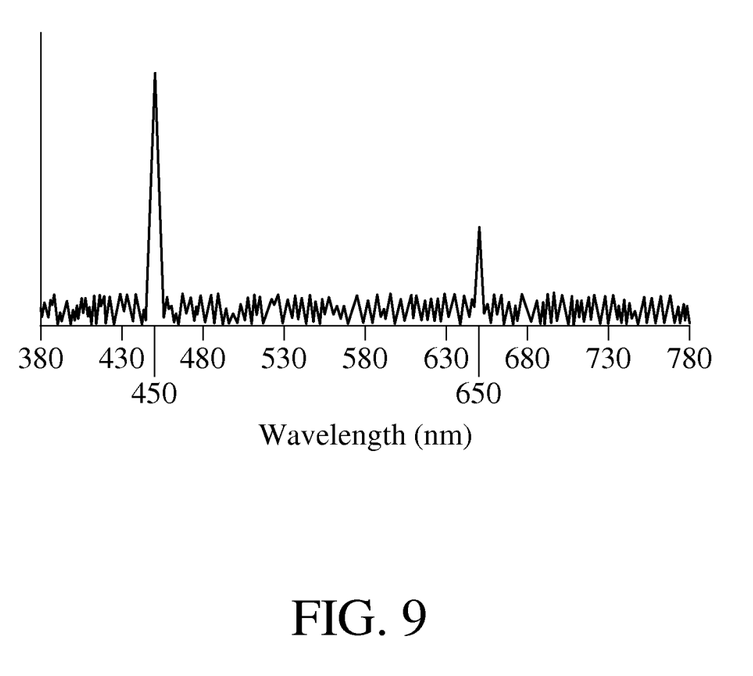
FIG. 9 is a schematic wavelength distribution diagram of a reflected light beam in an embodiment.

The calculation module 38 is electrically connected to the photosensor 344. The calculation module 38 calculates the height of the water film and the height of the top surface of the polishing pad 40 at the sampling point of the measuring module 34 according to the first wavelength of the first reflected light and the second wavelength of the second reflected light. Then, the calculation module 38 calculates the height delta between the water film and the top surface of the polishing pad 40 and corrects the height of the top surface of the polishing pad 40 according to the height delta and a refraction index in order to obtain the accurate height of the top surface of the polishing pad 40. The refraction index herein is associated with a medium (e.g. the water film) between the height of the water film (referred to as a first height) and the height of the top surface of the polishing pad 40 (referred to as a second height) at a sampling point to be measured. After the measuring module 34 uses the foregoing sampling rule to obtain the surface height of the top surface of the polishing pad 40 at each sampling point in the task region U, the calculation module 38 calculates the surface roughness of the polishing pad 40 according to the surface height of each sampling point in the task region U. In this way, a decision whether to renew the polishing pad 40 can be made according to the surface roughness of the polishing pad 40. In this embodiment, although the measuring module 34 merely measures the surface roughness in the task region U, and other embodiments may be contemplated in which the measuring module measures the surface roughness of the entire polishing pad 40.

Additionally, in an embodiment, the measuring module 34 further includes an air jet component used to perform a surface cleaning process to sampling points to be measured when the measuring module 34 projects light beams having different wavelengths onto the sampling points to be measured. The air jet component cleans up particles or the water film at the sampling point on the surface. A person skilled in the art can understand that the calculation module 38 will not receive any reflected light beam propagating from the water film or particles when the measuring module 34 can use the air jet component to perform the surface cleaning process to sampling points in advance or there is no water film at sampling points to be measured by the measuring module 34. Therefore, the correction of the height of the top surface of the polishing pad 40 can be ignored.

Figure 10:
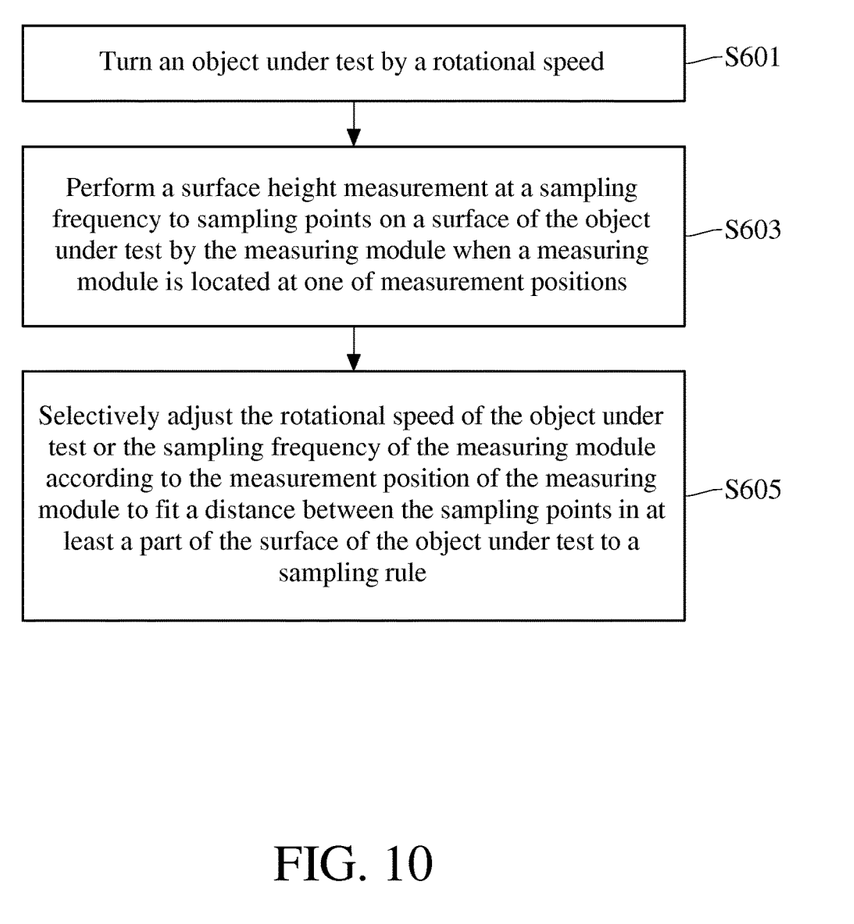
FIG. 10 is a flow chart of a surface measurement method in an embodiment.

To clarify the surface measurement method below, the aforementioned surface measuring device will be used as an assistant. Please refer to FIG. 1 and FIG. 10, which is a flow chart of a surface measurement method in an embodiment. The surface measurement method includes the following steps. In step S601, the rotary platform 10 turns the object under test 20 at a rotational speed. In step S603, when the measuring module 14 is at one of the measurement positions, the measuring module 14 performs the surface height measurement at a sampling frequency to the sampling points on the surface of the object under test 20. In step S605, the rotational speed of the object under test 20 or the sampling frequency of the measuring module 14 is selectively adjusted according to the position of the measuring module 14 on the shifting lever 121 in order that the sampling points in at least a part of the surface of the object under test 20 fits\ the sampling rule.

Figure 11:
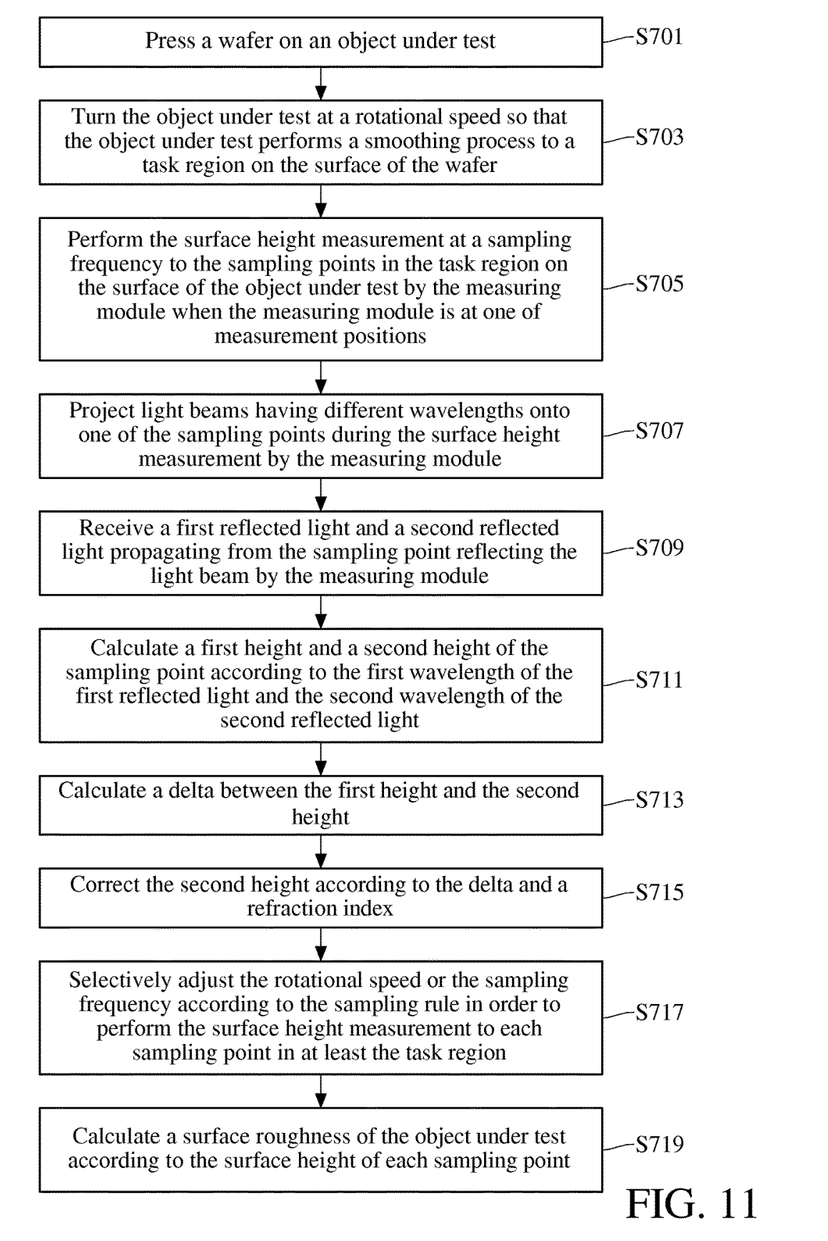
FIG. 11 is a flow chart of a surface measurement method in another embodiment.

Another embodiment is also contemplated with respect to FIG. 6 and FIG. 11 which is a flow chart of a surface measurement method. In step S701, the wafer 50 is pressed onto the polishing pad 40. In step S703, the polishing pad 40 is turned at a rotational speed so that the polishing pad 40 can perform the smoothing process to the task region U on the surface of the wafer 50. In step S705, when the measuring module 34 is at one of the measurement positions, the measuring module 34 performs the surface height measurement at a sampling frequency to the sampling points in the task region U on the surface of the polishing pad 40. In step S707, the measuring module 34 projects light beams having different wavelengths onto one of the sampling points during the surface height measurement. In step S709, the measuring module 34 receives a first reflected light and a second reflected light propagating from the sampling point reflecting the light beam. In step S711, a first height and a second height of the sampling point are calculated according to the first wavelength of the first reflected light and the second wavelength of the second reflected light. In step S713, the delta between the first height and the second height is calculated. In step S715, the second height is corrected according to the delta and a refraction index. In step S717, the rotational speed of the polishing pad 40 or the sampling frequency of the measuring module 34 is selectively adjusted according to the sampling rule in order to perform the surface height measurement on each sampling point in at least the task region U on the surface of the polishing pad 40. In step S719, the surface roughness of the polishing pad 40 is calculated according to the surface height of each sampling point.

As described in the above embodiments, the surface measuring device and the method thereof are used to employ the control module to selectively adjust the rotational speed of the rotary platform or the sampling frequency of the measuring module according to the measurement position of measuring module on the shifting lever so that the surface of the spinning object under test may evenly be sampled in order to accurately handle the surface status of the surface of the object under test. In an embodiment, the surface measuring device is further applied to the chemical-mechanical polishing (CMP) technology, where the surface measuring device measures the surface of the polishing pad while a wafer is being polished by the polishing pad. Through the even sampling of the surface of the polishing pad, the consumption status of the polishing pad may be handled more accurately for the decision whether to renew the polishing pad. Accordingly, the chemical-mechanical polishing technology using the disclosure may efficiently be enhanced, and the costs in a polish of semiconductor wafer may be controlled more efficiently.

What is claimed is:

1. A surface measuring device, comprising:
   a rotary platform configured to bear an object under test and turn the object under test at a rotational speed;
   a shifting lever disposed above the rotary platform;
   a measuring apparatus disposed on the shifting lever and configured to move to measurement positions on the shifting lever and perform a surface height measurement at a sampling frequency to sampling points on a surface of the object under test when the measuring apparatus is located at one of the measurement positions; and
   a control module in a processor configured to selectively adjust the rotational speed for the rotary platform or adjust the sampling frequency for the measuring apparatus according to the measurement position of the measuring apparatus on the shifting lever in order to fit a distance between the sampling points on at least one part of the surface of the object under test to a sampling rule.

2. The surface measuring device according to claim 1, wherein when each of the sampling points has the same distance with its closest sampling points on the at least part of the surface of the object under test, the sampling points on the at least one part of the surface of the object under test fit in the sampling rule.

3. The surface measuring device according to claim 2, wherein when the control module holds the rotational speed of the rotary platform, the control module adjusts the sampling frequency for the measuring apparatus according to positions of the sampling points.

4. The surface measuring device according to claim 3, wherein when the measurement position of the measuring apparatus on the shifting lever is at a preset position and the sampling frequency of the measuring apparatus is at a preset frequency, the control module adjusts the rotational speed for the rotary platform.

5. The surface measuring device according to claim 2, wherein when the control module holds the sampling frequency of the measuring apparatus, the control module adjusts the rotational speed for the rotary platform according to positions of the sampling points.

6. The surface measuring device according to claim 5, wherein when the measurement position of the measuring apparatus on the shifting lever is at a preset position and the rotational speed of the rotary platform is at a preset speed, the control module adjusts the sampling frequency of the measuring apparatus for sampling the rotary platform.

7. The surface measuring device according to claim 1, wherein the rotary platform comprises a spin axis and a polishing head, the object under test is a polishing pad, the object under test rotates around the spin axis, the polishing head is configured to press a wafer on the object under test so that the object under test rotated by the rotary platform contacts and smoothes the wafer.

8. The surface measuring device according to claim 7, wherein a region ranging from an edge, which is a first distance away from the spin axis, to another edge, which is a second distance away from the spin axis, on a top surface of the object under test is defined as a task region, and the object under test in the task region smoothes the wafer;
  when the wafer is being smoothed, the measuring apparatus selectively performs the surface height measurement on the sampling points in the task region of the object under test; and
  the sampling points in the task region fit in the sampling rule.

9. The surface measuring device according to claim 8, wherein a projection of the shifting lever to the surface of the object under test ranges at least from an edge, which is the first distance away from the spin axis, to another edge, which is the second distance away from the spin axis.

10. The surface measuring device according to claim 1, wherein the measuring apparatus measures one of the sampling points by projects light beams at different wavelengths;
  the measuring apparatus receives at least one reflected light beam from the measured sampling point when the measured sampling point reflects at least one of the light beams; and
  the measuring apparatus calculates a surface height of the measured sampling point according to the wavelength of the at least one reflected light beam.

11. The surface measuring device according to claim 10, wherein the at least reflected light beam received by the measuring apparatus comprises first reflected light and second reflected light, and the surface measuring device further comprises:
  a calculation module in the processor configured to calculate a first height and a second height of the measured sampling point according to a first wavelength of the first reflected light and a second wavelength of the second reflected light, calculate a delta between the first height and the second height, and calibrate the second height according to the delta and a refraction index,
  wherein the calibrated second height is the surface height of the measured sampling point, the first wavelength is shorter than the second wavelength, and the refraction index is associated to a medium between the first height and the second height at the measured sampling point.

12. The surface measuring device according to claim 11, wherein the calculation module calculates a surface roughness of the object under test according to the surface height of each of the sampling points.

13. The surface measuring device according to claim 10, wherein the measuring apparatus further comprises an air jet component configured to perform a surface cleaning process to the sampling point to be measured when the measuring apparatus projects the light beams for the measurement of one sampling point to be measured.

14. A surface measurement method, applied to a surface measuring device and comprising:
  turning an object under test by a rotational speed through a rotary platform of the surface measuring device;
  performing a surface height measurement at a sampling frequency to a plurality of sampling points on a surface of the object under test by a measuring apparatus of the surface measuring device when the measuring apparatus is located at one of a plurality of measurement positions on a shifting lever of the surface measuring device; and
  selectively adjusting the rotational speed of the object under test or the sampling frequency of the measuring apparatus according to the measurement position of the measuring apparatus to fit a distance between the sampling points in at least a part of the surface of the object under test to a sampling rule by a processor of the surface measuring device.

15. The surface measurement method according to claim 14, wherein when the distance between every two neighboring sampling points in the surface of the object under test is the same, the sampling points in the at least part of the surface of the object under test fits in the sampling rule.

16. The surface measurement method according to claim 15, wherein selectively adjusting the rotational speed of the object under test or the sampling frequency of the measuring apparatus comprises:
  adjusting the sampling frequency of the measuring apparatus according to positions of the sampling points when the rotational speed of the object under test is constant.

17. The surface measurement method according to claim 16, wherein selectively adjusting the rotational speed of the object under test or the sampling frequency of the measuring apparatus further comprises:
  adjusting the rotational speed of the object under test when the measurement position of the measuring apparatus is at a preset position and the sampling frequency of the measuring apparatus is at a preset frequency.

18. The surface measurement method according to claim 15, wherein selectively adjusting the rotational speed of the object under test or the sampling frequency of the measuring apparatus comprises:
  adjusting the rotational speed of a rotary platform according to positions of the sampling points when the sampling frequency of the measuring apparatus is constant.

19. The surface measurement method according to claim 18, wherein selectively adjusting the rotational speed of the object under test or the sampling frequency of the measuring apparatus further comprises:
  adjusting the sampling frequency of the measuring apparatus when the measurement position of the measuring apparatus is at a preset position and the rotational speed of the object under test is at a preset speed.

20. The surface measurement method according to claim 14, wherein the object under test is a polishing pad, and turning the object under test by the rotational speed comprises:
  pressing a wafer on the object under test by a polishing head of the rotary platform; and
  performing a smoothing process to the wafer by the object under test.

21. The surface measurement method according to claim 20, wherein a region ranging from an edge, which is a first distance away from a spin axis, to another edge, which is a second distance away from the spin axis, on a top surface of the object under test is defined as a task region; the smoothing process is performed to the wafer by the task region of the object under test;
  when the wafer is being smoothed, the measuring apparatus selectively performs the surface height measurement on the sampling points in the task region of the object under test; and
  the sampling points in the task region fits in the sampling rule.

22. The surface measurement method according to claim 21, wherein the measurement positions at least comprise a first measurement position and a second measurement position;
- a distance from the spin axis to a position of a projection of the first measurement position onto the surface of the object under test is defined as the first distance; and
- a distance from the spin axis to a position of a projection of the second measurement position onto the surface of the object under test is defined as the second distance.

23. The surface measurement method according to claim 14, wherein performing the surface height measurement at the sampling frequency to the sampling points on the surface of the object under test by the measuring apparatus comprises:
- projecting light beams having different wavelengths to one of the sampling points by the measuring apparatus;
- receiving at least one reflected light beam propagating from the sampling point, to which the light beams are projected, by the measuring apparatus; and
- calculating a surface height of the sampling point projected according to a wavelength of the at least one reflected light beam by the measuring apparatus.

24. The surface measurement method according to claim 23, wherein when the reflected light beam received by the measuring apparatus includes a first reflected light and a second reflected light, calculating the surface height of the sampling point projected according to the wavelength of the at least one reflected light beam comprises:
- calculating a first height and a second height of the sampling point, which is measured by the measuring apparatus, according to a first wavelength of the first reflected light and a second wavelength of the second reflected light by the processor;
- calculating a delta between the first height and the second height by the processor; and
- by the processor, correcting the second height according to the delta and a refraction index and setting the corrected second height to be the surface height of the sampling point to be measured;
- wherein the first wavelength is shorted than the second wavelength, and the refraction index is associated with a medium between the first height and the second height on the sampling point to be measured.

25. The surface measurement method according to claim 24, further comprising:
- calculating a surface roughness of the object under test according to the surface height of each of the sampling points by the processor.

26. The surface measurement method according to claim 23, wherein projecting the light beams to one of the sampling points by the measuring apparatus comprises:
- performing a surface cleaning process to the sampling point to be measured.

\* \* \* \* \*